United States Patent [19]
Allard

[11] 3,899,239
[45] Aug. 12, 1975

[54] INTEGRATED CIRCUIT TEST CLAMP
[75] Inventor: Frank L. Allard, Camarillo, Calif.
[73] Assignee: The United States of America as represented by the Secretary of the Navy, Washington, D.C.
[22] Filed: June 24, 1974
[21] Appl. No.: 482,285

[52] U.S. Cl. .............................. 339/255 P; 339/261
[51] Int. Cl.² ......................................... H01R 13/24
[58] Field of Search............ 339/17, 18, 75, 108 TP, 339/149–151, 176, 198, 255 P, 260, 261; 324/72.5,

[56] References Cited
UNITED STATES PATENTS
| | | | |
|---|---|---|---|
| 2,450,001 | 9/1948 | Humphries...................... | 339/198 R |
| 3,017,615 | 1/1962 | Smith et al...................... | 339/17 CF |
| 3,506,949 | 4/1970 | Venaleck et al.................. | 339/174 |

*Primary Examiner*—Joseph H. McGlynn
*Attorney, Agent, or Firm*—Richard S. Sciascia; Joseph M. St. Amand; David O'Reilly

[57] ABSTRACT

A circuit testing clamp constructed for use with integrated circuits having two body members forming a clamping jaw operated by a spiral spring. A plurality of contact pads on opposing surfaces of the contact jaws are connected to leads which pass through the body and extend out the upper end to eyelets for easy attachment of test probes. To provide the maximum separation for attachment of test probes, alternate leads are brought out of the body of the clamp at 90° angles. The body of the clamp is composed of a hard heat resistant insulating material hinged together to maintain pressure at the contact area by the tension of the spiral spring.

3 Claims, 3 Drawing Figures

INTEGRATED CIRCUIT TEST CLAMP

STATEMENT OF GOVERNMENT INTEREST

The invention described herein may be manufactured by or for the Government of the United States of America for governmental purposes without the payment of any royalties thereon or therefor.

BACKGROUND OF THE INVENTION

This invention relates generally to test fixtures and more particularly relates to a clamp for testing miniaturized circuits such as integrated circuit modules.

The most logical and reliable method of testing integrated circuits (IC) and other miniaturized electronic circuits is by use of an oscilloscope, observing input/output signals under dynamic conditions directly at the IC connector pins. In order to do this, it is necessary that one or more test probes connected firmly to a test point at or immediately adjacent to the IC connector pins. One known tester for this purpose offers a very limited capability; that is, the available test fixture provides only short pins (one-fourth inch or less) with a diameter of less than the common paper clip wire for connecting test probes to. These pins are spaced only one-tenth inch apart. Therefore, it can be seen that working with such a fixture is inconvenient, frustrating, and can result in shorting of adjacent pins very easily due to their closeness. Another known device provides an electrical connector clip similar to that proposed except that it has straight wires passing through the body which are easily bent and inadequate spacing for connecting test leads. The shorting, of course, can cause IC or equipment damage. Due to the danger of shorts, the equipment must be turned off before connecting and disconnecting test probes. Because of the smallness of pins, the type of probe that can be connected to these devices is very limited. When attempting to make a connection, any inadvertent move of the test probe will cause the probe to slip off the pin and cause a short to adjacent pins. The proposed test fixture clamps onto an IC module and provides connecting test points with maximum separation without soldering to the IC connector pins.

SUMMARY OF THE INVENTION

The purpose of this invention is to provide a device for connecting to miniaturized circuits such as integrated circuit modules while providing maximum separation for connecting test leads. The device has two wide body portions hinged together to provide jaws which clamp onto a circuit by the action of a spiral spring. Contact pads on opposing surfaces of the clamp jaw are connected to leads extending through the body upward to eyelets. Maximum separation of the eyelets is provided by spacing adjacent leads at 90° angles to each other. The leads terminate in loops or eyelets which simplify connection of test probes. The two body portions of the device are constructed of a hard insulating material such as plastic which should also be heat resistant.

OBJECTS OF THE INVENTION

It is one object of the present invention to provide a circuit test fixture which can be used with miniaturized circuits such as integrated circuit modules.

Another object of the present invention is to provide a circuit test fixture which provides maximum separation of pins in a miniaturized circuit.

Yet another object of the present invention is to provide a circuit test fixture which permits connecting to a miniaturized circuit without disabling the circuit.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
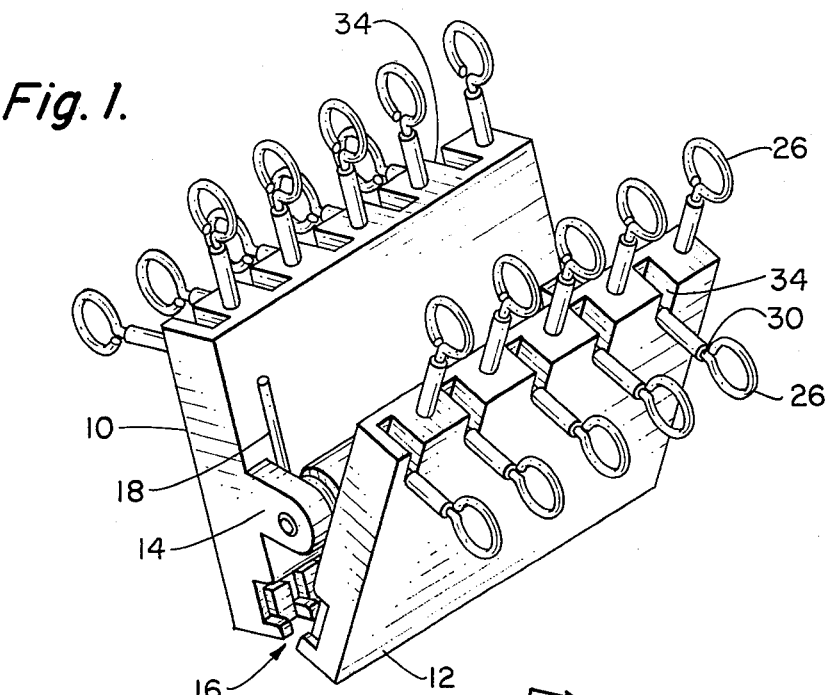
FIG. 1 is a perspective view of the circuit test clamp of the present invention.

Referring to FIG. 1, the circuit test clamp of the present invention is comprised of two body portions 10 and 12 joined together by hinge 14. The hinge 14 provides a pivot point for opening and closing the clamp jaws indicated at 16, which can be seen more clearly in the side view of FIG. 2. The clamping force is provided by spiral spring 18 which can also act as the pin passing through the hinged portions of body members 10 and 12, holding them together.

Figure 2:
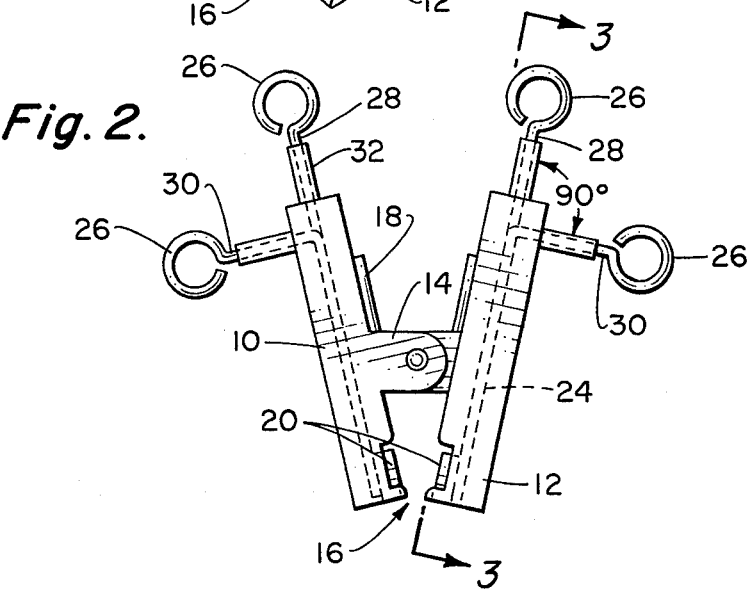
FIG. 2 is a side elevation of the circuit test clamp of the present invention.
Figure 3:
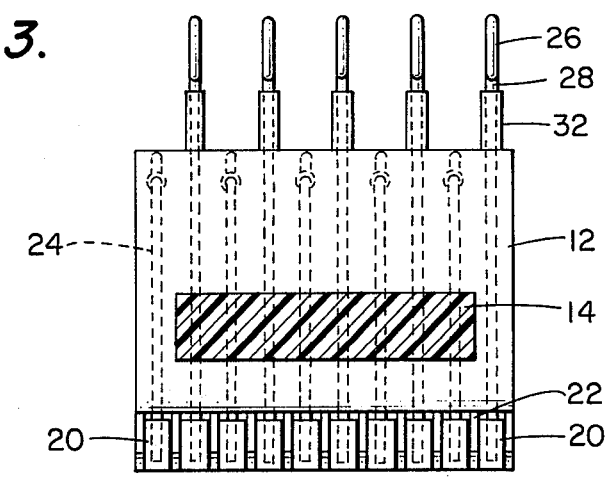
FIG. 3 is a sectional view of the circuit test clamp taken at 3—3 of FIG. 2.

The sectional view of FIG. 3 illustrates the manner in which the circuit clamp makes contact with the pins of an integrated circuit module. A plurality of contact pads 20, which may be rectangular, square, etc., are embedded in the jaw end of the body 12. Ridges or teeth 22 between each contact pad prevent contact of more than one pad with one pin of the integrated circuit module. Leads 24 connected to the contact pads 20 are molded into the body members 10 and 12 and extend out the top part, as shown in FIG. 2. There are 10 contact pads 20 and 10 leads 24 in each body member 10 and 12 of the circuit clamp, but there may be more or less, as desired, depending upon the number of circuit pins in use on the integrated circuit module.

An important feature of the invention is the separation provided by alternately angling the leads 24 as they emerge from the upper portion of the body members 10 and 12. Each lead is alternately bent at 90° to the adjacent lead, as shown in FIGS. 1 and 2. In this manner, maximum separation between vertical leads 28 and horizontal leads 30 is provided. Eyelets 26, provided on the end of each lead 24, assist in making positive connection of test leads. To further prevent shorting of adjacent wires, suitable insulation, as shown at 32, may be provided on the exposed portion of leads 24, leaving only the eyelets 26 for making connections. As further protection from shorting, horizontal leads 30 extend outward from notches 34.

To connect the circuit test clamp to an integrated circuit module, the upper portion of solid body members 10 and 12 is squeezed together, opening the jaw portion 16. The clamp is then placed over the integrated circuit module and released, permitting the jaw portion 16 to be clamped onto the pins of the module. Each contact pad 20 will engage a separate pin of the integrated circuit module with ridges 22 preventing the pins of the module from bridging two contact pads 20.

Thus, there has been disclosed a circuit test clamp for integrated circuit modules which provides a positive means of connection for test equipment probes and leads. The use of eyelets also provides a means whereby one or more probe or test leads can be used simultaneously during troubleshooting tests. The 90° separation between adjacent eyelets provides maximum separation, thus eliminating short circuit possibilities. The body portions 10 and 12 of the test clamp obviously should be constructed of an insulating material such as plastic (Teflon) or other suitable material.

Obviously many modifications and variations of the present invention are possible in light of the above teachings. It is therefore to be understood that within the scope of the appended claims the invention may be practiced otherwise than as specifically described.

I claim:

1. An integrated circuit test clamp comprising:
a first solid body member;
a second solid body member hingedly connected to the first solid body member to form a clamping jaw;
a spring between said first and second body members biasing said jaw toward a closed position;
a plurality of contact pads along the edge of said first and second body members forming the clamping jaws;
a wire lead connected to each contact pad extending through said solid body members and out of the upper surface; and
means providing maximum separation between adjacent leads;
said means for providing maximum separation comprising alternately extending leads out the top and side of said solid body members, respectively; the leads extending out of the sides being substantially perpendicular to the plane of the contact pads whereby shorting of leads is minimized by the physical separation and the solid body material between adjacent leads.

2. The circuit test clamp according to claim 1 further including eyelets on the end of each lead to permit positive connection of test probes.

3. The circuit test clamp according to claim 2 wherein said contact pads are separated by ridges to prevent adjacent contacts from being bridged by an integrated circuit lead.

* * * * *